(12) United States Patent
Horley

(10) Patent No.: US 8,966,323 B2
(45) Date of Patent: Feb. 24, 2015

(54) MONITORING MULTIPLE DATA TRANSFERS

(75) Inventor: John Michael Horley, Hauxton (GB)

(73) Assignee: ARM Limited, Cambridge (GB)

( * ) Notice: Subject to any disclaimer, the term of this patent is extended or adjusted under 35 U.S.C. 154(b) by 953 days.

(21) Appl. No.: 12/929,044

(22) Filed: Dec. 23, 2010

(65) Prior Publication Data

US 2012/0166887 A1    Jun. 28, 2012

(51) Int. Cl.
*G06F 11/00* (2006.01)
*G06F 11/34* (2006.01)

(52) U.S. Cl.
CPC .................... *G06F 11/348* (2013.01)
USPC .......................................................... 714/45

(58) Field of Classification Search
CPC ............ G06F 11/3636; G06F 11/3476; G06F 11/348; G06F 11/3466
USPC .......................................................... 714/45
See application file for complete search history.

(56) References Cited

U.S. PATENT DOCUMENTS

| | | | |
|---|---|---|---|
| 2005/0120185 A1* | 6/2005 | Yamazaki et al. | 711/147 |
| 2006/0259823 A1* | 11/2006 | Sohm et al. | 714/38 |
| 2007/0043933 A1* | 2/2007 | Moir et al. | 712/226 |
| 2009/0006934 A1* | 1/2009 | Horley et al. | 714/819 |
| 2009/0125756 A1* | 5/2009 | Swaine et al. | 714/45 |
| 2009/0313507 A1* | 12/2009 | Swaine et al. | 714/38 |

* cited by examiner

*Primary Examiner* — Scott Baderman
*Assistant Examiner* — Jigar Patel
(74) *Attorney, Agent, or Firm* — Nixon & Vanderhye P.C.

(57) ABSTRACT

Trace circuitry for monitoring a behavior of at least one processor and for generating items of trace data indicative of processing activities of said at least one processor executing a stream of instructions is disclosed. The stream of instructions comprises different types of instructions, each type specifying a different operation, at least one type of instruction comprising a multiple transfer instruction specifying a plurality of data transfers. The trace circuitry is responsive to detection of the at least one processor executing at least one of the multiple transfer instructions and to an indication that at least one of the plurality of data transfers is to be traced: to output for each of the data transfers to be traced a value indicative of a predetermined index value associated with the data transfer, the at least one multiple transfer instruction having predetermined index values associated with each of the plurality of data transfers, such that the predetermined index value provides individual identification of each of the data transfers.

22 Claims, 7 Drawing Sheets

| Instruction | Predetermined Index value |
|---|---|
| LPM {$R_1$, $R_3$, $R_2$, $R_4$, $R_5$} | 0, 1, 2, 3, 4 |
| STM {$R_1$, — $R_5$} | 0, 1, 2, 3, 4 |
| SWP { load <br> store | 0 <br> 1 |

FIG. 4a

| execution stream | trace enable | index output in trace stream |
|---|---|---|
| LPM (R$_1$, R$_3$, R$_2$, R$_4$, R$_5$) | | |
| R$_1$ | 0 | – |
| R$_3$ | 1 | explicit 1 |
| R$_2$ | 1 | incr +1 |
| R$_4$ | 1 | incr +1 |
| R$_5$ | 1 | incr +1 |
| STM {R$_1$, — R$_5$} | | |
| R$_1$ | 1 | first |
| R$_2$ | 1 | incr +1 |
| R$_5$ | 1 | explicit 4 |
| R$_3$ | 1 | explicit 2 |
| R$_4$ | 0 | – |
| LD R$_1$ | 1 | first |

FIG. 4b

MONITORING MULTIPLE DATA TRANSFERS

BACKGROUND OF THE INVENTION

1. Field of the Invention

The field of the invention relates to data processing and in particular to diagnostic mechanisms for monitoring data processing operations.

2. Description of the Prior Art

There are a number of occasions where it is desirable to keep track of the processing being performed by a processing circuit. For example, such information is useful during the development of data processing systems. An example of a tool that may be used to assist in such a process is a tracing tool.

Tracing the activity of a data processing system whereby a trace stream is generated that includes data representing the step-by-step activity within the system is a highly useful tool in system development. Such tracing tools use a variety of means for tracing the program flow including embedded trace macrocells (ETM, a trademark of ARM Limited, Cambridge) which are present on the chip whose processing is being monitored.

These tracing tools can be used to reconstruct the state of a machine at a certain point during execution of the instruction stream and in order to do this may require knowledge of data transfers to registers if the contents of the registers are to be reconstructed or may require knowledge of data transfers to particular addresses if the memory state is to be reconstructed.

When tracing multiple load and store instructions it is important to understand which data transfers correspond to which CPU registers. The above is relatively straightforward if as is usual data transfers occurr in address order. In such a case the address can be used to identify the originating register. However, there are some problem cases such as the SWP instruction where both transfers are to the same address and in the case where filtering of trace data occurs (to reduce the amount of trace data output) so that only some of the data transfers of a multiple data transfer may be traced.

This has been addressed by ARM® of Cambridge England in its ETMv3 by defining the first transfer of the SWP instruction as always being the load and the second the store. With filtering it does not allow trace to be turned off during the tracing of a multiple data transfer, thus the number of data transfers traced is always the last set of a multiple data transfer. So in a LDM{r1-r5} for example, if there are 3 transfers traced, you know they are from r3, r4 and r5.

Although, some of the problems associated with relating individual data transfers from a multiple data transfer to the correct transfer have been addressed in the prior art, in the case of an out-of-order processor, the transfers may occur in any order and thus, simply not allowing trace to turn off during a multiple data transfer will not be sufficient to determine which of the multiple data transfer the transfers that are actually traced are as they could be any of them.

It should be noted that transfers occur out-of-order where for example some of the data values to be accessed are cached or where a register is not available for a store.

It would be desirable to be able to identify individual data transfers from a multiple data transfer even in an out-of-order processor.

SUMMARY OF THE INVENTION

A first aspect of the present invention provides trace circuitry for monitoring a behaviour of at least one processor and for generating items of trace data indicative of processing activities of said at least one processor executing a stream of instructions, said stream of instructions comprising different types of instructions, each type specifying a different operation at least one type of instruction comprising a multiple transfer instruction specifying a plurality of data transfers; said trace circuitry being responsive to detection of said at least one processor executing at least one of said multiple transfer instructions and to an indication that at least one of said plurality of data transfers is to be traced: to output for each of said data transfers to be traced a value indicative of a predetermined index value associated with said data transfer, said at least one multiple transfer instruction having predetermined index values associated with each of said plurality of data transfers, such that said predetermined index value provides individual identification of each of said data transfers.

The present invention recognises the problems that can occur with multiple data transfer instructions and addresses them by providing predetermined index values associated with each of the plurality of data transfers for a particular multiple transfer instruction. These predetermined index values provide individual identification for each of the data transfers. Thus, the trace circuitry is responsive to the processor executing one of the multiple data transfer instructions to output for each of the data transfers to be traced a value that is indicative of the predetermined index value associated with that data transfer. Thus, by the use of index values the individual data transfers can be linked back to the original multiple transfer instruction. Provided the diagnostic circuitry that analyses the trace data is aware of the predetermined index values for each type of multiple transfer instruction then these index values are sufficient to tie the trace back to the particular data transfer of the multiple transfer instruction and by the use of a simple index value one can identify the individual transfers.

In some embodiments, said trace circuitry is configured to output a trace element with said value indicative of said predetermined index value for at least some of said data transfers to be traced, such that each trace element output having an associated index value can be linked to a corresponding one of said plurality of data transfers.

It may be that the data transfer triggers output of a trace element itself, this may be the address of that data transfer or an indication of the data transferred. Associated with this trace element will be a value indicative of the index value so that this trace element can be tied back to the particular transfer that triggered its output. Alternatively, in some embodiments a trace element will not be output by the data transfer other than the value indicative of the index value index value itself. This value will be used by the analysing circuit to identify that the transfer has occurred and which transfer it was.

In some embodiments, said value indicative of said index value comprises said index value.

A simple way of outputting the index value is to output the value itself. However, this may not be the most efficient way to output the index value and in some embodiments a value indicative of the index value is output. This value may have fewer bits than the index value itself and yet be sufficient to enable the index value to be identified. This may be the case where a sequence of index values are being output in a particular order. This will be described later with some examples.

In some embodiments said at least one multiple transfer instruction comprises an instruction specifying a plurality of different types of data transfer, said trace circuitry being configured to associate a corresponding plurality of predetermined index values with said instruction, each index value identifying one of said different types of data transfer.

The multiple transfer instruction may be an instruction that specifies a plurality of different types of data transfer, for example a load and a store. In such a case, the index value may be used to identify which type of data transfer has been performed.

Examples of these multiple transfer instructions that specify different types of data transfers could be a swap instruction or store exclusive instruction.

In some embodiments said at least one multiple transfer instruction comprises a store-exclusive instruction, said trace circuitry being configured to associate a plurality of predetermined index values with said instruction, at least one index value identifying one or more transfers for the stored data, and an additional index value indicating whether the store-exclusive instruction successfully performed the store.

In addition to indicating which of the transfers has been performed an index value may also be used to indicate that an instruction has successfully performed a store.

In some embodiments, said at least one multiple transfer instruction comprises an instruction for performing a plurality of data transfers to or from a plurality of locations, said trace circuitry being configured to associate a plurality of predetermined consecutive index values with said plurality of data transfers of said instruction, and said trace circuitry is configured in response to detection of said at least one processor executing said at least one multiple transfer instruction and to an indication that at least some consecutive ones of said plurality of data transfers are to be traced: to output a first index value corresponding to said first of said consecutive plurality of data transfers to be traced with said corresponding trace element, and to output a value indicating that said index value is a consecutive index value to subsequent ones of said consecutive data transfers.

The multiple transfer instruction may be one for performing a plurality of data transfers such as a multiple load or a multiple store. Although, an out-of-order processor may perform these multiple transfers in any order, it is often the case that they are performed in a consecutive order. Thus, it may be advantageous to output an indication of the first of a plurality of consecutive data transfers and then simply output a value indicating that the next index value is a consecutive index value. In this way, rather than outputting individual index values one could in one example output a first index value and then a value indicating the next value is that index value plus 1 or perhaps that index value minus 1. Such an indicator requires fewer bits than is the case if the individual index values are each output. Thus, this can be a very bandwidth efficient way of tracing these multiple data transfers.

In some embodiments said trace circuitry is configured in response to detection of said at least one processor executing a multiple load or store instruction for loading or storing multiple data items from a contiguous block of memory and to an indication that at least some of said multiple load or stores are to be traced: to output a first index value corresponding to said first of said multiple load or stores to be traced with said corresponding trace element, and to output a next index value indicating that said data transfers of said multiple load or store instruction are in address order.

As noted above instructions which perform multiple transfers may require fewer bits to trace them if the indices indicate this. For example, multiple transfers to or from a contiguous block of memory need only one data address to be traced and all of the other data addresses can be calculated from subsequent indices which indicate which one of the multiple data transfers has been performed. This has benefits for trace bandwidth.

However, this does not only apply to contiguous blocks of memory, but to any instruction where multiple transfers are performed and they are all relative to one address. For example the SWP instruction where both addresses are the same and are not contiguous. Another example would be an instruction which loads vector elements, where the first element is at 1000, the next at 1010, the next at 1020 etc, but they are not contiguous. By only tracing address 1000 with index 0, the addresses for index 1 and 2 etc can be calculated.

In some embodiments, at least one of said plurality of data transfers is a transfer to or from a register and an index value corresponding to said at least one data transfer identifies said register.

It may be that the plurality of data transfers are transfers to or from registers and the index value identifies the register. It is often important when tracing to know which registers are being used in order to be able to restore the state of the registers at a particular point if required. An index value can be used to identify a register and in some embodiments the index value may be the name of the register itself.

In some embodiments, said trace circuitry is configured for at least one of said multiple transfer instructions to associate said predetermined index values with each of said plurality of data transfers.

Although associating the predetermined index value with the particular data transfer can be done in different ways, it can be done in the trace circuitry in some embodiments. In other embodiments it may be done in the data processing apparatus that is executing the instructions, however, it is trace circuitry within this data processing apparatus that performs this association.

A second aspect of the present invention provides a data processing apparatus and a data processing apparatus comprising at least one processor for executing a stream of instructions, said stream of instructions comprising different types of instructions, each type specifying a different operation, at least one type of instruction comprising a multiple transfer instruction specifying a plurality of data transfers, and trace circuitry according to a first aspect of the present invention, for monitoring processing activities of said at least one processor and for generating a stream of trace data in response to said monitoring.

In some embodiments, said at least one processor is configured for at least one of said multiple transfer instructions to associate said predetermined index values with each of said plurality of data transfers.

As noted previously it may be the processor itself that associates the predetermined index values with the data transfers.

In some embodiments said at least one processor comprises an out-of-order processor configured to execute instructions from said instruction stream in an order that is not constricted to said order of said instruction stream.

A problem with tying transfers performed from a multiple transfer instruction with the actual instructed transfer may arise when the processor is an out-of-order processor so that the order that the instructions are executed is not necessarily the order of the instruction stream. It may also arise in some embodiments when said at least one processor is configured to perform at least some of said multiple data transfers specified by said at least one multiple transfer instruction in an order that is to different to an order specified by said at least one instruction.

For example, where some of the data in a multiple transfer is present in a cache and others are not, then the transfer of the cached data will occur more quickly than the data that is not cached and if the processor is one that allows this to happen and does not insist that the transfers are performed in the order they are issued, then the problem of tying an individual transfer back to the instructed transfer arises and is addressed in embodiments by the use of predetermined index values issued by the processor.

A third aspect of the present invention provides a diagnostic apparatus comprising an input for receiving a stream of trace data from a data processing apparatus executing a stream of instructions including at least one multiple transfer instruction specifying a plurality of data transfers, said stream of trace data comprising at least one trace element having a value indicative of an index value associated with it; wherein said diagnostic apparatus comprises analysing circuitry for analysing said trace data, said analysing circuitry being responsive to receipt of a trace element comprising a value indicative of an index value to: identify said at least one multiple transfer instruction triggering output of said trace element and to determine an index value from said value indicative of said index value; identify which of said plurality of data transfers specified by said identified at least one multiple transfer instruction corresponds to said index value.

Provided the analysing circuitry is provided with the information regarding the association between the predetermined index values and the particular data transfer from the multiple transfer instruction then the analysing circuitry can identify the particular transfer from that index value once it has determined which type of multiple transfer instruction triggered output of this trace data.

In some embodiments, said diagnostic apparatus further comprises a data store for storing a plurality of index values associated with said at least one multiple transfer instruction, each of said plurality of index values identifying one of said plurality of data transfers specified by said at least one multiple transfer instruction; said analysing circuitry being configured to compare said index value with said stored index values for said identified at least one multiple transfer instruction and in response to a match to identify said data transfer generating said trace element from said plurality of data transfers specified by said identified at least one multiple transfer instruction.

One way that the diagnostic apparatus may be able to relate the index values to the particular transfer is to have a store of the index values for each type of multiple transfer instruction such that when it receives an index value it can determine which transfer this index value relates to.

A fourth aspect of the present invention provides a diagnostic system comprising a data processing apparatus according to a second aspect of the present invention for generating a stream of trace data and a diagnostic apparatus according to a third aspect of the present invention for analysing said stream of trace data.

A fifth aspect of the present invention provides a method of tracing processing activities of at least one processor executing a stream of instructions, said stream of instructions comprising different types of instructions, each type specifying a different operation, at least one type of instruction comprising a multiple transfer instruction specifying a plurality of data transfers, said method comprising: monitoring a behaviour of said at least one processor; identifying execution of at least one of said multiple transfer instructions and trace being enabled; associating a predetermined index value with each of said plurality of data transfers of said multiple transfer instruction to be traced; outputting for each of said data transfers to be traced a trace element comprising a value indicative of said predetermined index value associated with said data transfer, such that said trace element can be linked to a corresponding one of said plurality of data transfers.

A sixth aspect of the present invention provides a method of analysing a stream of trace data, comprising: receiving a stream of trace data from a data processing apparatus executing a stream of instructions including at least one multiple transfer instruction specifying a plurality of data transfers, said stream of trace data comprising at least one trace element comprising a value indicative of a predetermined index value; in response to receipt of a trace element comprising a value indicative of a predetermined index value: identifying said at least one multiple transfer instruction generating said trace element; determining said index value from said value indicative of said index value; identifying one of said plurality of data transfers specified by said at least one multiple transfer instruction from said index value.

A seventh aspect of the present invention provides a computer program product for storing a computer program which when executed by a processor performs the steps of a method according to a sixth aspect of the present invention.

An eighth aspect of the present invention provides a trace means for monitoring a behaviour of at least one processor and for generating items of trace data indicative of processing activities of said at least one processor executing a stream of instructions, said stream of instructions comprising different types of instructions, each type specifying a different operation, at least one type of instruction comprising a multiple transfer instruction specifying a plurality of data transfers; said trace means being for outputting for each of said data transfers to be traced a value indicative of a predetermined index value associated with said data transfer, said at least one multiple transfer instruction having predetermined index values associated with each of said plurality of data transfers, such that said predetermined index value provides individual identification of each of said data transfers, in response to detection of said at least one processor executing at least one of said multiple transfer instructions and to an indication that at least one of said plurality of data transfers is to be traced.

The above, and other objects, features and advantages of this invention will be apparent from the following detailed description of illustrative embodiments which is to be read in connection with the accompanying drawings.

BRIEF DESCRIPTION OF THE DRAWINGS

FIG. 4a shows the example predetermined index values that can be associated with multiple transfer instruction;

FIG. 4b shows some example trace output when these example instructions are executed;

DESCRIPTION OF THE PREFERRED EMBODIMENTS

Figure 1:
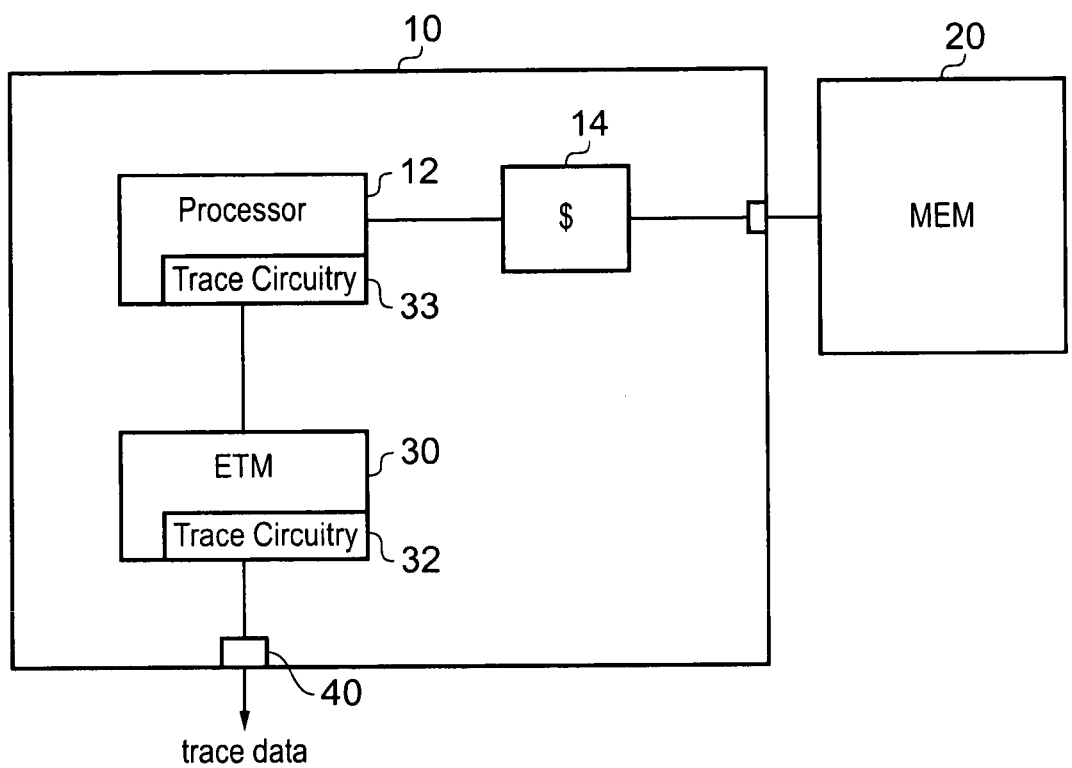
FIG. 1 shows a data processing apparatus according to an embodiment of the present invention.

FIG. 1 shows a data processing apparatus 10 connected to memory 20 having a processor 12 which can access a cache 14 or memory 20 and a trace unit 30 in the form of an embedded trace macrocell (ETM). There is trace circuitry 32 within the ETM 30 and also trace circuitry 33 within the processor 12.

The processor 12 executes a stream of instructions, some of which are multiple transfer instructions. The processor 12 may execute some of these out of order, in that the instructions may be executed in a different order to that of the instruction stream and in the case of a multiple data transfer instruction the data transfers may not be executed in the order specified in the instruction. For example, where the instruction is a multiple load instruction and one of the values to be loaded is present in cache 14 and another isn't, the load of the value present in the cache may complete before the load of the value not in the cache even if the latter was issued later.

Processor 12 has some trace circuitry 33 within it which is configured to identify multiple transfer instructions that are being executed and to associate predetermined index values with individual transfers within these multiple data transfers, such that when tracing a multiple transfer the appropriate index value is transmitted to the ETM 30 for each transfer to be traced. In this way the information that reaches the ETM 30 is that one of these multiple transfer instructions has executed and the index values appearing in a certain order allow the ETM 30 to understand the order in which they completed. It should be noted that in some embodiments the trace circuitry 33 is configured not to output any index value where the multiple transfer occurs in order. If this is the case the predetermined index values are not required as in their absence the ETM 30 will assume an instruction order of transfer.

ETM 30 also comprises trace circuitry 32 that can query processor 12 when trace enable is on and can receive in response to the query, information regarding the execution of the stream of instructions and where there are multiple data transfer instructions occurring out of order, index values associated with each of the transfers. It can from this information generate trace elements and these are output via the trace data output 40. As is known in the art trace data can take a number of forms. Thus, with multiple data transfers the data address may be output as a trace element and if this is the case it may have the index value associated with it. Alternatively the only trace elements output may be the index values themselves.

Figure 2:
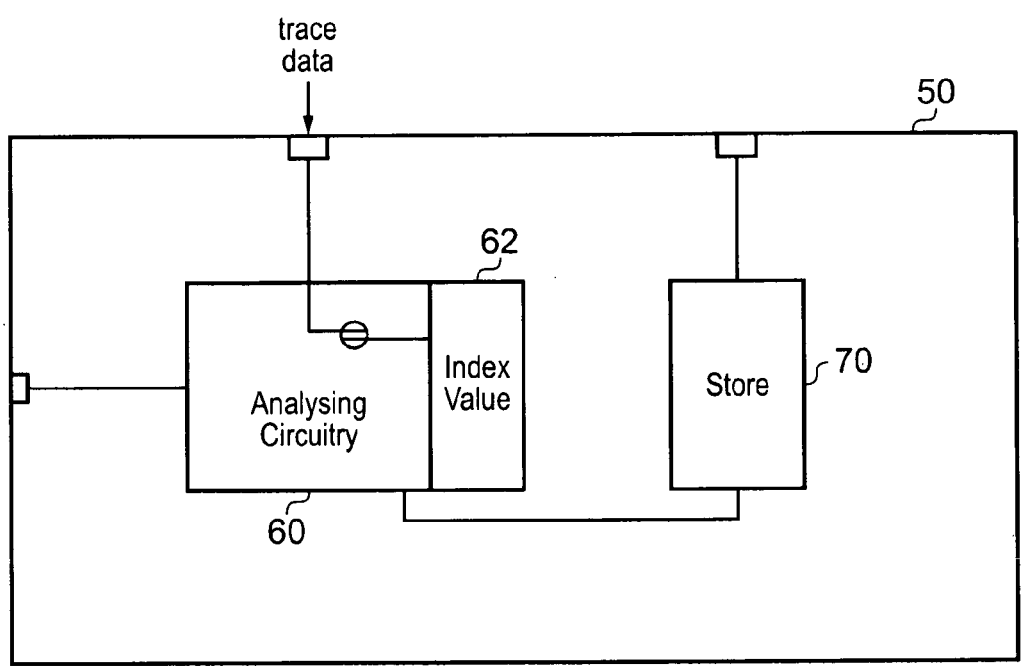
FIG. 2 shows a diagnostic apparatus according to an embodiment of the present invention.

FIG. 2 shows analysing apparatus 50 for receiving the trace data stream from data processing apparatus 10 of FIG. 1 and for analysing it. Analysing apparatus 50 has analysing circuitry 60 which in this embodiment has a data store 62 for storing index values related to particular types of multiple transfer instructions. Thus, when the trace data is received index values within the trace data, or index values derived from the trace data can be compared with values in the index value store and in response to a match the data transfer being traced can be identified.

In this regard, analysing circuitry 50 requires information on which instructions in the instruction stream are currently being executed so that it can relate the trace elements received to the instructions. Thus, in this embodiment there is a data store 70 which stores a program image and the analysing circuitry 60 can determine from this program image the instruction to which particular trace elements relate.

Figure 3:
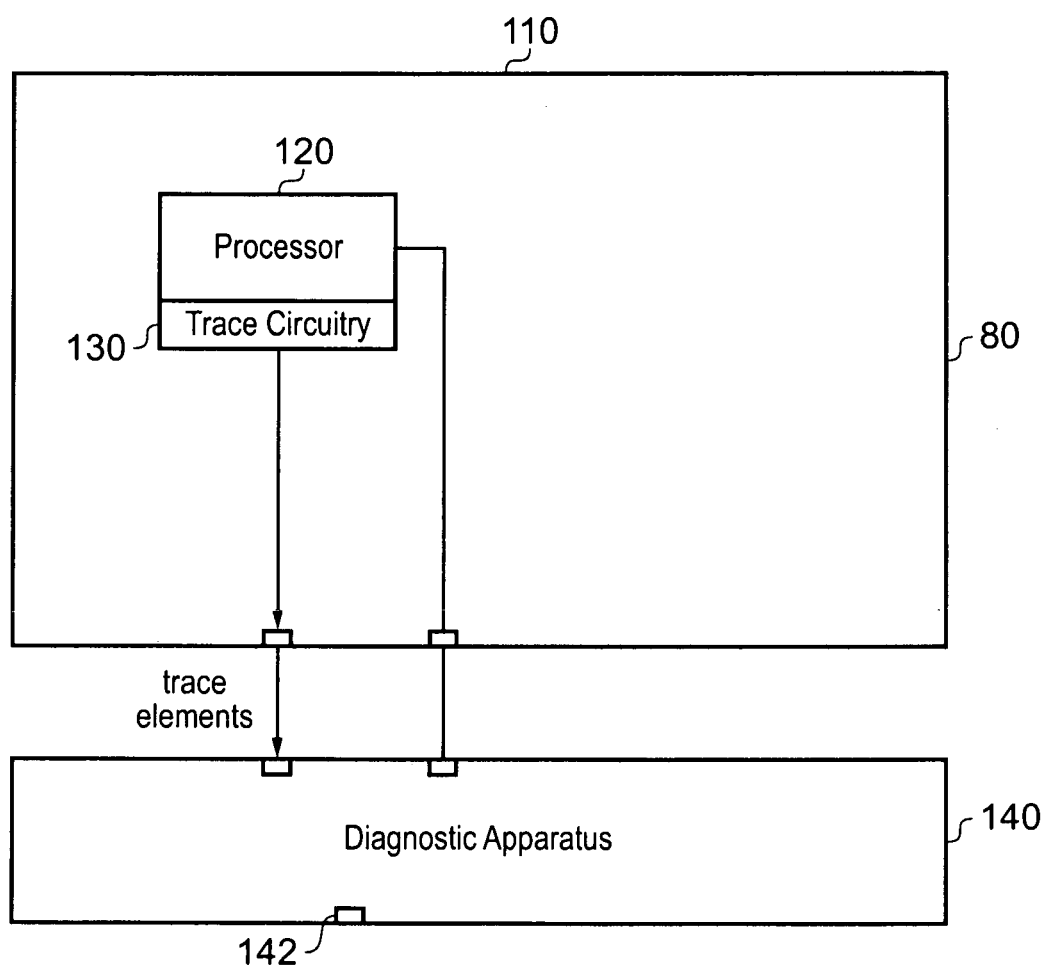
FIG. 3 shows a diagnostic system according to an embodiment of the present invention.

FIG. 3 shows a diagnostic system according to an embodiment of the present invention. Diagnostic system 80 comprises a data processing apparatus 110 having a processor 120 which has trace circuitry 130 within it. This trace circuitry 130 monitors the processor executing a stream of instructions and generates trace data. If a multiple transfer instruction is executed, the trace circuitry will generate predetermined index values to associate with each individual data transfer within the multiple transfer so that the diagnostic apparatus 140 can tie the trace elements back to the particular data transfer that occurred. In this embodiment, the trace elements are output by diagnostic apparatus 140 via output 142 to analysing circuitry (not shown) for analysis.

Diagnostic apparatus 140 does not have a program image store in this embodiment, rather it receives information regarding the current instruction stream being executed from the data processing apparatus 80 that is being monitored. For example, if in the trace stream there is an address 1000 it will query the data processing apparatus to find out the point in the instruction stream that this occurs and will then receive a string of instructions that will have executed after address 1000.

FIG. 4a shows some example multiple transfer instructions and some predetermined index values that can be associated with them. Thus, a multiple load instruction LDM for loading registers R1, R3, R2, R4 and R5 has index values associated with each of these individual transfers. Thus, the loading of a value into R1 is indicated by index value 0 while the loading of register R4 for example will be indicated by index value 3. Thus, trace elements generated in response to each of these loads will have these index values associated with them so that the diagnostic apparatus analysing the trace stream will be able to determine which trace elements relate to which load.

The second instruction illustrated is a multiple store instruction STM and this stores values to registers R1 to R5. The predetermined index values that relate to this instruction are 0, 1, 2, 3 and 4 which relate to the stores to registers R1, 2, 3, 4 and R5 respectively.

Also shown is a swap instruction SWP which has two data transfer stages associated with it a load and a store. In this case, the particular type of transfer is indicated by an index value, a load operation being indicated by a trace index value of 0 and a store by a trace index value of 1.

Other examples of multiple data transfer instructions that can be traced using predetermined index values are multiple transfers to or from a contiguous block of memory. In this case the first transfer traced outputs the data address and an index value. Subsequent transfers are identified by an index value, and the address can be determined from a knowledge of the instruction and the first address.

Multiple transfers not to contiguous addresses but to a pattern of addresses can also be traced in this way. For example an instruction which loads vector elements, where the first element is at 1000, the next at 1010, the next at 1020 etc. In this case address 1000 along with index 0 can be traced, and the addresses for index 1 and 2 etc can then be determined without outputting the actual address in the trace stream.

Furthermore, transfer instructions that are conditional and may not complete may also have a predetermined index value that can be output in the trace stream to indicate that the transfer has completed. For example an exclusive store may have a predetermined index value in the trace that indicates that the data has been stored.

FIG. 4b shows example trace streams that are generated in response to the execution of these multiple data transfer instructions.

In this example the multiple load instruction illustrated in FIG. 4a is executed first and in this example the load instruction is executed in the order that the requests are issued and thus, register R1 is loaded first then R3 then R2 then R4 and then R5. However, trace is not enabled for the loading of register R1 and thus, no trace is output. Trace is enabled for the loading of register R3 and thus, an index value needs to be output such that the trace analyser can determine which of the multiple data transfers has occurred. The loading of register R3 has an index value of 1 associated with it and thus, in the trace stream there is an explicit indicator followed by a 1. This indicates that the explicit index value is being output and that it is a 1. The analyser can then tie this back to the loading of register R3. The next register loadings occur in order and thus, rather than outputting the explicit index value for each one can simply output an indicator that the index value increments in this case by 1. Thus, the trace stream has a plurality of increment 1 indicators. This is very bandwidth efficient and allows the information to be output in a relatively few number of bits.

The multiple store instruction is then executed and for this instruction the multiple transfer is not executed in the order that it is issued thus, register R1 and register R2 are loaded first but then register R5 is loaded. Now in this case trace is enabled at the beginning of this instruction and thus the first index value output for this instruction is a first indicator. This index value indicates that the first of the multiple transfers has executed. This can be tied back by the analyser to being R1. R2 is the next store issued by this instruction and as this completes next, the index value in the trace stream can simply be an increment 1 indicator. The next store that occurs is that of register R5. This is out of order and thus, the explicit index value relating to this data transfer needs to be output in the trace stream and thus an explicit 4 is output. Similarly, with the storing of register R3 an explicit 2 needs to be output. Trace is then disabled and thus, no trace is output. The final instruction in this example instruction stream is a single load to register R1. In this embodiment, single loads are treated in the same way as multiple loads and thus, one always outputs an index indicting that the first data transfer for this instruction has been performed.

Figure 5:
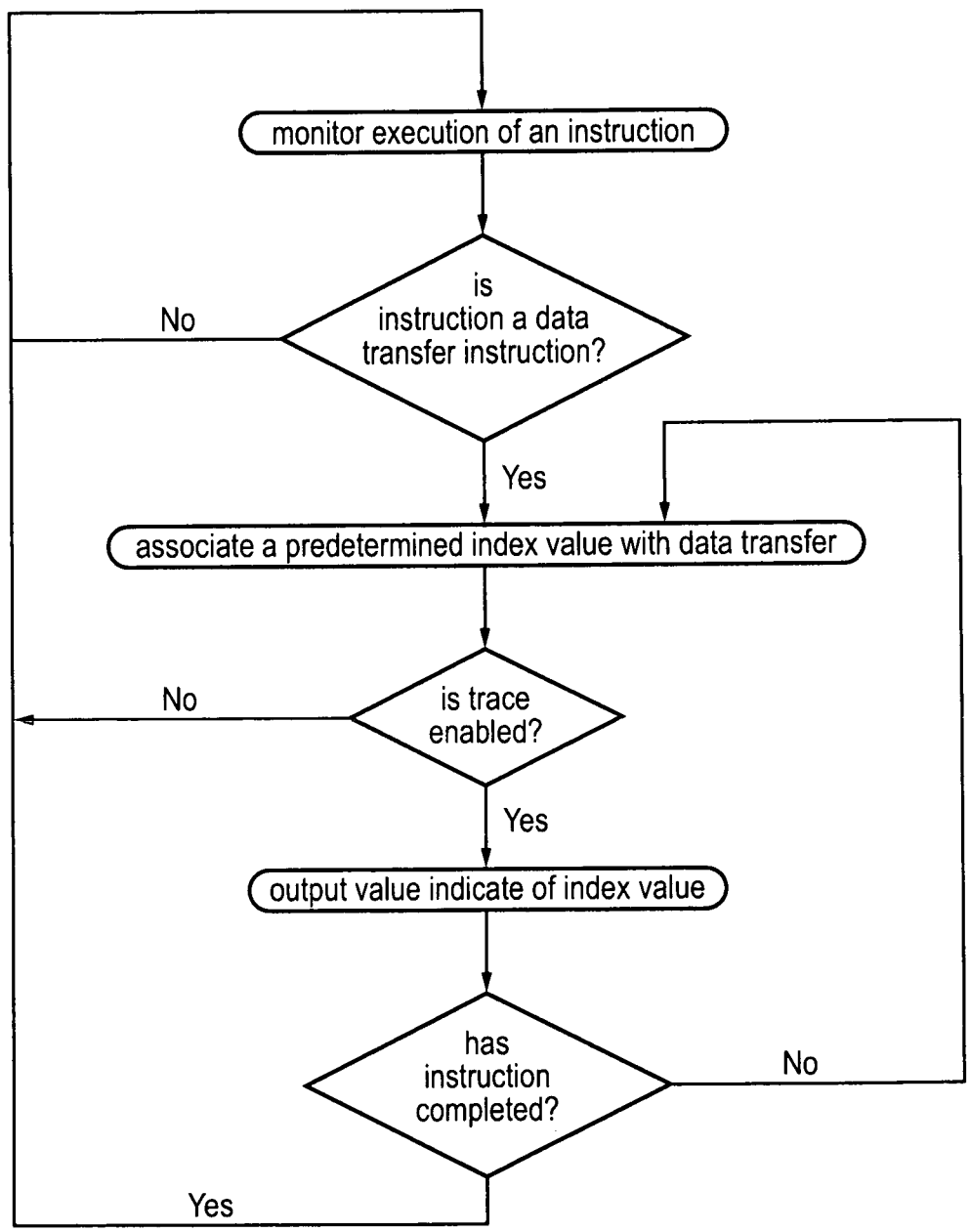
FIG. 5 shows a flow diagram illustrating method steps for tracing multiple transfer instructions according to an embodiment of the present invention.

FIG. 5 shows a flow diagram illustrating steps of a method according to an embodiment of the present invention. In this embodiment, the execution of a stream of instructions is monitored. For each instruction monitored it is determined whether the instruction is a data transfer instruction or not. If it is a datatransfer instruction then a predetermined index value for identifying that individual data transfer is associated with that data transfer. It is then determined if trace is enabled. If trace is enabled then a value indicative of the index value that has been associated with that data transfer is output. A trace element indicating perhaps the address of the transfer may also be output although this is not shown.

It is then determined if the data transfer instruction is complete. If it isn't then the predetermined index value associated with the next data transfer is associated with it and once again this is output if trace is enabled. If the data transfer instruction is complete then the next instruction is analysed.

Figure 6:
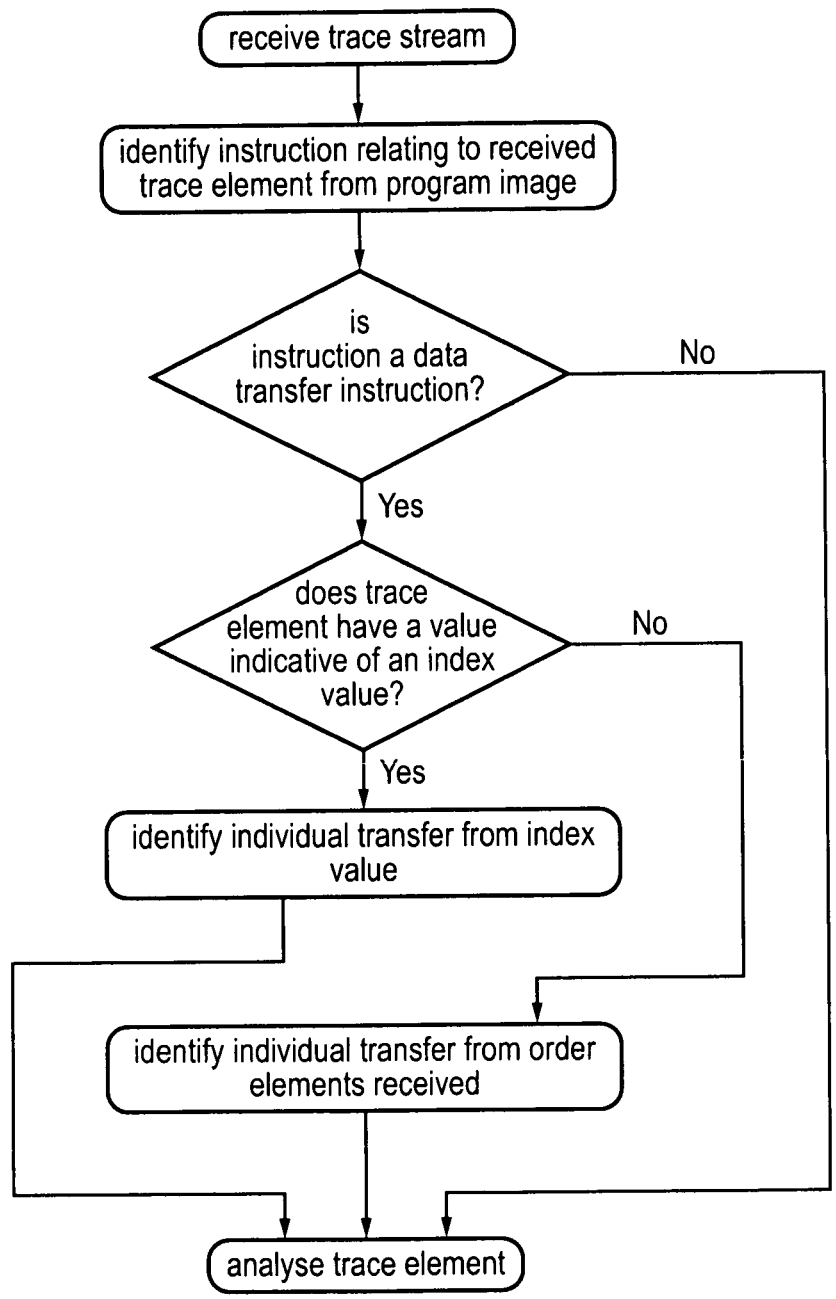
FIG. 6 shows a flow diagram illustrating steps in a method for analysing trace data according to an embodiment of the present invention.

FIG. 6 shows steps in a method for analysing a trace stream generated by embodiments of the present invention. The trace stream is received and the instruction relating to a received trace element is identified from the program image. It is then determined if the instruction is a multiple transfer instruction. If it is then it is determined if there is a value indicative of an index value associated with or forming the trace element. If so the index value is determined and compared to stored index values for this particular multiple transfer instruction and the individual transfer is identified. If the instruction does not have an index value and it is a multiple transfer instruction then it is determined in the absence of index values that the multiple transfer is occurring in order and the individual transfer is identified from the order the trace elements are received. The trace element is then analysed. If the instruction that the trace element relates to is not a multiple transfer then the trace element received is analysed in the conventional way.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent claims could be made with the features of the independent claims without departing from the scope of the present invention.

I claim:

1. Trace circuitry for monitoring a behaviour of at least one processor and for generating a trace stream containing items of trace data indicative of processing activities of said at least one processor executing a stream of instructions, said stream of instructions comprising different types of instructions, each type specifying a different operation, at least one type of instruction comprising a multiple transfer instruction specifying a plurality of data transfers;

said trace circuitry configured to respond to detection of said at least one processor executing at least one of said multiple transfer instructions and to an indication that at least one of said plurality of data transfers is to be traced:

to output in said trace stream for each of said data transfers to be traced a value indicative of a predetermined index value associated with said data transfer, said at least one multiple transfer instruction having predetermined index values associated with each of said plurality of data transfers, such that said predetermined index value provides individual identification of each of said data transfers.

2. Trace circuitry according to claim 1, said trace circuitry configured to output in said trace stream a trace element with said value indicative of said predetermined index value for at least some of said data transfers to be traced, such that each trace element output having an associated index value can be linked to a corresponding one of said plurality of data transfers.

3. Trace circuitry according to claim 1, wherein said value indicative of said index value comprises said index value.

4. Trace circuitry according to claim 1, wherein said at least one multiple transfer instruction comprises an instruction specifying a plurality of different types of data transfer, said trace circuitry being configured to associate a corresponding plurality of predetermined index values with said instruction, each index value identifying one of said different types of data transfer.

5. Trace circuitry according to claim 4, wherein said at least one multiple transfer instruction comprises at least one of a swap instruction and a store exclusive instruction.

6. Trace circuitry according to claim 4, wherein said at least one multiple transfer instruction comprises a store-exclusive instruction, said trace circuitry being configured to associate a plurality of predetermined index values with said instruction, at least one index value identifying one or more transfers for the stored data, and an additional index value indicating whether the store-exclusive instruction successfully performed the store.

7. Trace circuitry according to claim 1, wherein said at least one multiple transfer instruction comprises an instruction for performing a plurality of data transfers to or from a plurality of locations, said trace circuitry being configured to associate a plurality of predetermined consecutive index values with said plurality of data transfers of said instruction, and said trace circuitry is configured in response to detection of said at least one processor executing said at least one multiple transfer instruction and to an indication that at least some consecutive ones of said plurality of data transfers are to be traced:

to output in said trace stream a first index value corresponding to said first of said consecutive plurality of data transfers to be traced with said corresponding trace element, and to output in said trace stream a value indicating that said index value is a consecutive index value to subsequent ones of said consecutive data transfers.

8. Trace circuitry according to claim 1, wherein said multiple transfer instruction comprises at least one of a multiple load instruction and a multiple store instruction.

9. Trace circuitry according to claim 1, and said trace circuitry is configured in response to detection of said at least one processor executing a multiple load or store instruction for loading or storing multiple data items from a contiguous block of memory and to an indication that at least some of said multiple load or stores are to be traced:

to output in said trace stream a first index value corresponding to said first of said multiple load or stores to be traced with said corresponding trace element, and to output in said trace stream a next index value indicating that said data transfers of said multiple load or store instruction are in address order.

10. Trace circuitry according to claim 1, wherein at least one of said plurality of data transfers is a transfer to or from a register and an index value corresponding to said at least one data transfer identifies said register.

11. Trace circuitry according to claim 1, said trace circuitry being configured for at least one of said multiple transfer instructions to associate said predetermined index values with each of said plurality of data transfers.

12. A data processing apparatus comprising at least one processor for executing a stream of instructions, said stream of instructions comprising different types of instructions, each type specifying a different operation, at least one type of instruction comprising a multiple transfer instruction specifying a plurality of data transfers, and trace circuitry according to claim 1, for monitoring processing activities of said at least one processor and for generating said trace stream of trace data in response to said monitoring.

13. A data processing apparatus according to claim 12, wherein said at least one processor is configured for at least one of said multiple transfer instructions to associate said predetermined index values with each of said plurality of data transfers.

14. A data processing apparatus according to claim 12, wherein said at least one processor comprises an out of order processor configured to execute instructions from said instruction stream in an order that is not constricted to said order of said instruction stream.

15. A data processing apparatus according to claim 12, wherein said at least one processor is configured to perform at least some of said multiple data transfers specified by said at least one multiple transfer instruction in an order that is to different to an order specified by said at least one instruction.

16. A diagnostic apparatus comprising an input for receiving a trace stream of trace data from a data processing apparatus executing a stream of instructions including at least one multiple transfer instruction specifying a plurality of data transfers, said trace stream of trace data comprising at least one trace element having a value indicative of an index value associated with it; wherein said diagnostic apparatus comprises analysing circuitry for analysing said trace data, said analysing circuitry being responsive to receipt of a trace element comprising a value indicative of an index value to:

identify said at least one multiple transfer instruction triggering output of said trace element and to determine an index value from said value indicative of said index value;

identify which of said plurality of data transfers specified by said identified at least one multiple transfer instruction corresponds to said index value.

17. A diagnostic apparatus according to claim 16, said diagnostic apparatus further comprising:

a data store for storing a plurality of index values associated with said at least one multiple transfer instruction, each of said plurality of index values identifying one of said plurality of data transfers specified by said at least one multiple transfer instruction;

said analysing circuitry being configured to compare said index value with said stored index values for said identified at least one multiple transfer instruction and in response to a match to identify said data transfer generating said trace element from said plurality of data transfers specified by said identified at least one multiple transfer instruction.

18. A diagnostic system comprising a data processing apparatus according to claim 12 for generating a trace stream of trace data and a diagnostic apparatus for analysing said trace stream of trace data, said diagnostic apparatus comprising an input for receiving the trace stream of trace data from a data processing apparatus executing a stream of instructions including at least one multiple transfer instruction specifying a plurality of data transfers, said stream of trace data comprising at least one trace element having a value indicative of an index value associated with it; wherein said diagnostic apparatus comprises analysing circuitry for analysing said trace data, said analysing circuitry being responsive to receipt of a trace element comprising a value indicative of an index value to:

identify said at least one multiple transfer instruction triggering output of said trace element and to determine an index value from said value indicative of said index value;

identify which of said plurality of data transfers specified by said identified at least one multiple transfer instruction corresponds to said index value.

19. A method of generating a trace stream indicative of processing activities of at least one processor executing a stream of instructions, said stream of instructions comprising different types of instructions, each type specifying a different operation, at least one type of instruction comprising a multiple transfer instruction specifying a plurality of data transfers, said method comprising:

monitoring a behaviour of said at least one processor;

identifying execution of at least one of said multiple transfer instructions and trace being enabled;

associating a predetermined index value with each of said plurality of data transfers of said multiple transfer instruction to be traced;

outputting in said trace stream, for each of said data transfers to be traced, a trace element comprising a value indicative of said predetermined index value associated with said data transfer, such that said trace element can be linked to a corresponding one of said plurality of data transfers.

20. A method of analysing a trace stream of trace data, comprising:

receiving said trace stream of trace data from a processor executing a stream of instructions including at least one multiple transfer instruction specifying a plurality of data transfers, said trace stream of trace data comprising at least one trace element comprising a value indicative of a predetermined index value;

in response to receipt of a trace element comprising a value indicative of a predetermined index value:

identifying said at least one multiple transfer instruction generating said trace element;

determining said index value from said value indicative of said index value;

identifying one of said plurality of data transfers specified by said at least one multiple transfer instruction from said index value, said above method steps are implemented on a data processing apparatus.

21. A computer program product including a non-transitory computer readable storage medium for storing a computer program which, when executed by a processor, performs the steps of a method according to claim 20.

22. A trace means for monitoring a behaviour of at least one processor and for generating a trace stream containing items of trace data indicative of processing activities of said at least one processor executing a stream of instructions, said stream of instructions comprising different types of instructions, each type specifying a different operation, at least one type of instruction comprising a multiple transfer instruction specifying a plurality of data transfers;

said trace means being for outputting in said trace stream, for each of said data transfers to be traced, a value indicative of a predetermined index value associated with said data transfer, said at least one multiple transfer instruction having predetermined index values associated with each of said plurality of data transfers, such that said predetermined index value provides individual identification of each of said data transfers, in response to detection of said at least one processor executing at least one of said multiple transfer instructions and to an indication that at least one of said plurality of data transfers is to be traced.

\* \* \* \* \*